Patented Sept. 25, 1945

2,385,394

UNITED STATES PATENT OFFICE 2,385,394

SOLID IODINE COMPOSITIONS AND METHODS FOR PRODUCING THE SAME

Paul J. Witte, New York, N. Y., assignor to Tyler Laboratories, Incorporated, Brooklyn, N. Y., a corporation of New York No Drawing. Application April 13, 1943, Serial No. 482,941

8 Claims. (Cl. 167—70)

The present invention relates to iodine compositions and methods for producing the same, and relates more particularly to solid iodine compositions from which aqueous iodine solutions may be produced by the addition of water and, after the addition of water, having the general characteristics of the aqueous iodine compounds disclosed in my United States Patent No. 2,281,612, dated May 5, 1942. The iodine compositions referred to are suitable in some phases, as will be apparent from the following, for use as antiseptics and for pharmacological purposes, as well as a medium for introducing iodine into nutritional material or the like.

The solid iodine compositions of the present invention have marked advantages over the aqueous iodine compounds of my United States Patent above referred to especially in that such solid iodine compounds are relatively compact and light in weight for comparative strengths.

It may here be noted that the aqueous iodine compounds of my United States Patent No. 2,281,612 are not susceptible in a practical sense to being readily reduced to a solid state and the problem of providing a solid iodine compound of useful characteristics has required a different approach as will appear from the following.

One of the objects of the present invention is to provide a superior solid iodine composition which by the mere addition of water may be converted into an active antiseptic solution.

Another object of the present invention is to provide a superior water-soluble solid iodine composition which will remain stable under adverse conditions.

A further object of the present invention is to provide a superior solid iodine composition which comprises both chemically combined iodine and free iodine and which chemically combined iodine and free iodine are water soluble so that when water is added to the complete composition, the latter will readily dissolve and thus enable the resultant aqueous solution to maintain the free iodine in solution.

Still another object of the present invention is to provide a superior substantially-dry iodine composition which may be readily dusted or otherwise applied directly to the tissue of wounds and which will be converted into an active aqueous antiseptic by the fluids present in such wounds.

A still further object of the present invention is to provide a superior and economical method whereby solid iodine compositions may be produced without depriving such iodine compositions of their antiseptic, pharmacological or nutritional properties.

With the above and other objects in view, as will appear to those skilled in the art from the present disclosure, this invention includes all features in the said disclosure which are novel over the prior art and which are not claimed in any separate application.

The solid water-soluble iodine compositions of the present invention are characterized by a combination of one or more acid salts of protein derivatives, iodine chemically combined with another element and free iodine.

The acid salt of a protein derivative may be of various compositions such, for instance, as glycine hydrochloride, glycine hydroiodide, etc. In turn, the chemically combined iodine may be in any one of a variety of forms such, for instance, as sodium iodide, potassium iodide and iodide salts combining other of the alkali metals or alkaline-earth metals.

Inasmuch as a number of acid salts of glycine or the like may be combined in producing the solid iodine compositions of the present invention, it is to be understood that as used herein, the simple reference to an acid salt of glycine is intended to connote either a single acid salt of glycine and/or a mixture of two or more of the same. The same meaning is to be given the use herein of the term "iodide salt" or its equivalent.

The various salts, acids, acid salts, etc., which may be used in making up the solid iodine compositions of the present invention, may be varied in almost innumerable ways and by way of example, the following are given:

*Formulas*

| Ingredients | | A | B | C | D | E | F | G | H | I | J | K | L | M |
|---|---|---|---|---|---|---|---|---|---|---|---|---|---|---|
| Free iodine | grams | 20.00 | 20.00 | 20.00 | 20.00 | 20.00 | 20.00 | 20.00 | 20.00 | 20.00 | 20.00 | 20.00 | 20.00 | 20.00 |
| Glycine | do | 27.60 | 27.60 | 27.60 | 27.60 | 27.60 | 27.60 | 27.60 | 27.60 | 27.60 | 27.60 | 27.60 | 27.60 | 27.60 |
| NaI | do | 34.40 | 43.40 | 43.40 | 34.40 | 31.60 | 22.60 | 34.40 | 34.40 | 19.50 | 32.34 | 21.60 | 45.48 | 34.79 |
| NaCl | do | 3.50 | | 0.41 | 3.91 | 5.01 | 8.51 | 3.91 | 3.50 | 9.30 | 5.12 | 9.30 | | 3.82 |
| NaHSO₄ | do | | | 0.85 | 0.85 | 0.85 | 0.85 | 0.85 | | | | | | 0.24 |
| Na₂SO₄ | do | 1.00 | 1.00 | | | | | | 1.00 | 1.00 | 16.49 | 16.49 | 1.94 | 0.28 |
| KI | do | 14.28 | 4.32 | 4.32 | 14.28 | 4.32 | 14.28 | 1.20 | | 16.50 | | | 6.53 | 5.63 |
| KCl | do | 1.04 | 5.48 | 5.48 | 1.04 | 5.48 | 1.04 | 6.92 | 7.40 | 11.50 | | 9.62 | | 4.88 |
| 57% HI | cubic centimeters | | | | | 10.58 | 10.58 | 10.58 | 11.50 | 11.50 | 5.51 | | 5.51 | 6.59 |
| 13M.HCl | do | 6.60 | 6.60 | 6.06 | 6.06 | | | | | | 1.17 | 1.17 | 1.17 | 2.19 |
| 6M.H₂SO₄ | do | | | | | | | | | | | | | 0.50 |

In producing the solid iodine compositions from the above ingredients, the glycine or other suitable protein derivative is reacted with the selected acid in the presence of water to produce an acid hydro-salt (glycine hydrochloride, glycine hydroiodide, glycine acid sulfate). The acid hydro-salt thus produced should be dried (preferably air dried) and then ground to a fine powder (about 150 mesh, for instance), the remaining constituents may then be added to the powdered acid salt of glycine and the whole thoroughly mixed, and if necessary, ground to the desired fineness.

In instances where two or more acids are to be reacted with glycine to produce a plurality of acid salts of glycine, each acid should be separately reacted with its own quota of glycine and then dried. After the various acid salts of glycine are in a dry state, they may be mixed together without harmful interaction.

If desired, all save the free iodine may be added to the acid salt of glycine or its equivalent before the same is dried, but it must be borne in mind that the free or metallic iodine should not be added until after the acid salt of glycine has been dried.

Each of the formulas above given may be kept in powdered form or, if desired, compressed into tablets of desired size.

Each of the formulas above given when put together in the manner described, will result in a solid iodine composition which when diluted to 1000 cc. by the addition of water, will produce a solution containing substantially 4 grams of combined iodine and 2 grams of free iodine per 100 cc. of solution. The use of a lesser or greater amount of water will, of course, increase or decrease the iodine concentration within wide limits.

If it is desired to reduce the amount of free or elemental iodine in the solid composition in order to produce an aqueous solution of lower free iodine content with a given quantity of water, the respective quantities of combined iodine and free iodine may be reduced from those given in the above formulas. Preferably, however, the other salts should remain substantially the same in order to produce substantially the same concentration of potassium chloride, sodium chloride and sodium sulfate in the ultimate solution. Thus, the final solution might readily be caused to contain 1% free iodine and 2% combined iodine when the solid composition is diluted by water to 1000 cc.

In other instances where it is desired to have a lesser free or elemental iodine content, the solid composition may be diluted with a solid (powder) extender or a solid diluent which is inert or substantially inert to free iodine. Glycine has been found to be an ideal extender. Urea and other related amino products such as are produced in the human system as the result of natural protein decomposition, are also suitable as extenders since the same are not readily reactive with free iodine, yet are conducive to a rapid healing.

In instances where it is desired to prepare the solid iodine compositions of the present invention for dusting or other introduction directly into wounds, such compositions should be prepared with but only about 0.5% of free iodine, since when so diluted, the composition will not produce an overly-strong concentration by going into solution with the moderate amount of serum or blood usually associated with wounds. When glycine is employed as the extender, the same has been found to promote rapid healing.

When the iodine compositions of the present invention are introduced into wounds, the resultant solution contains free iodine which serves the purpose of sterilizing the area of contact without causing undue irritation or injury to the tissue. The water-soluble solid iodine compositions of the present invention, when introduced into wounds, provide instantly available free iodine for sterilization purposes, and such sterilization does not have to await the slow decomposition of a strongly stable iodine compound such as is the case with iodoform.

When the powdered iodine compositions of the present invention are suitably extended by the addition of glycine or its equivalent, such extended compositions may be formed into a stable mild antiseptic paste for the treatment of skin abrasions or irritations requiring an antiseptic paste, by the addition of a small amount of water or other solvent to cause partial solution only, thus forming a solid-solution mixture for ready application to the afflicted areas.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A solid water-soluble iodine composition including in combination: a solid un-ionized acid salt of glycine; free or elemental iodine; and a solid un-ionized iodide salt selected from the group consisting of alkali metal and alkaline-earth metal iodides; the said composition being characterized by its ability to hold free iodine in solution when the whole solid composition is dissolved in water.

2. A solid water-soluble iodine composition including in combination: a solid un-ionized acid salt of glycine; free or elemental iodine; a solid un-ionized iodide salt selected from the group consisting of alkali metal and alkaline-earth metal iodides; and uncombined or free glycine; the said composition being characterized by its ability to hold free iodine in solution when the whole solid composition is dissolved in water.

3. A powdered water-soluble iodine composition, including in combination: a solid un-ionized acid salt of glycine; free or elemental iodine; and a solid un-ionized iodide salt selected from the group consisting of alkali metal and alkaline-earth metal iodides; the said powdered composition of matter being characterized by its ability to hold free iodine in solution when the whole of said powdered composition is dissolved in water.

4. A powdered water-soluble iodine-containing composition of matter, including in combination: a solid un-ionized acid salt of glycine; free or elemental iodine; a solid un-ionized iodide salt selected from the group consisting of alkali metal and alkaline-earth metal iodides; and solid uncombined or free glycine; the said powdered composition of matter being characterized by its ability to hold free iodine in solution when the whole of said powdered composition is dissolved in water.

5. A water-soluble compressed tablet of iodine composition, including in combination: a solid un-ionized acid salt of glycine; free or elemental iodine; and a solid un-ionized iodide salt selected from the group consisting of alkali metal and alkaline-earth metal iodides; the said compressed tablet being characterized by its ability to hold free iodine in solution when the tablet is dissolved in water.

6. A water-soluble compressed tablet of iodine composition, including in combination: a solid un-ionized acid salt of glycine; free or elemental iodine; a solid un-ionized iodide salt selected from the group consisting of alkali metal and alkaline-earth metal iodides; and solid uncombined or free glycine; the said compressed tablet being characterized by its ability to hold free iodine in solution when the table is dissolved in water.

7. A process for producing a solid water-soluble iodine composition capable of holding free iodine in solution when the whole solid compound is dissolved in water, the said process comprising: providing an acid salt of glycine in solid form; mixing a solid un-ionized iodide salt with the said solid acid salt of glycine, the said iodide salt being selected from the group consisting of alkali metal and alkaline-earth metal iodides; and mixing free or elemental iodine with the said acid salt of glycine and the said iodide salt but only while the two latter constituents are in a solid dry form.

8. A process for producing a solid water-soluble iodine composition capable of holding free iodine in solution when the whole composition is dissolved in water, the said process comprising: reacting an acid with glycine to form an acid salt of glycine; drying the acid salt of glycine thus produced; mixing a solid un-ionized iodide salt with the said acid salt of glycine, the said iodide salt being selected from the group consisting of alkali metal and alkaline-earth metal iodides; and mixing free or elemental iodine with the said other constituents but only after the said acid salt of glycine has been dried.

PAUL J. WITTE.